(12) United States Patent
Golovanov et al.

(10) Patent No.: US 12,013,988 B1
(45) Date of Patent: Jun. 18, 2024

(54) ADJUSTING BRIGHTNESS OF LIGHT SOURCES OF CONTROLLER

(71) Applicant: Varjo Technologies Oy, Helsinki (FI)

(72) Inventors: Roman Golovanov, Helsinki (FI); Oleksandr Dovzhenko, Espoo (FI); Juha Ala-Luhtala, Helsinki (FI)

(73) Assignee: Varjo Technologies Dy, Helsinki (FI)

( * ) Notice: Subject to any disclaimer, the term of this patent is extended or adjusted under 35 U.S.C. 154(b) by 0 days.

(21) Appl. No.: 18/325,750

(22) Filed: May 30, 2023

(51) Int. Cl.
| | |
|---|---|
| *G06F 3/03* | (2006.01) |
| *G06F 1/16* | (2006.01) |
| *G06F 3/01* | (2006.01) |
| *G06T 7/60* | (2017.01) |
| *G06T 7/70* | (2017.01) |
| *H05B 45/10* | (2020.01) |
| *H05B 45/325* | (2020.01) |
| *H05B 47/115* | (2020.01) |

(52) U.S. Cl.
CPC ............ *G06F 3/0308* (2013.01); *G06F 1/163* (2013.01); *G06F 3/011* (2013.01); *G06T 7/60* (2013.01); *G06T 7/70* (2017.01); *H05B 45/10* (2020.01); *H05B 45/325* (2020.01); *H05B 47/115* (2020.01)

(58) Field of Classification Search
None
See application file for complete search history.

(56) References Cited

U.S. PATENT DOCUMENTS

2018/0330521 A1\* 11/2018 Samples ................... G06T 7/80

\* cited by examiner

*Primary Examiner* — Christopher J Kohlman
(74) *Attorney, Agent, or Firm* — Ziegler IP Law Group

(57) ABSTRACT

A tracking system includes light sources arranged spatially around user-interaction controller(s) of head-mounted device; a controller-pose-tracking means is arranged in the user-interaction controller(s); an HMD-pose-tracking means and camera(s) arranged on a portion of HMD that faces a real-world environment. Processor(s) are configured to estimate a relative pose of the controller(s) with respect to the HMD, determine current value and/or pulse width modulation (PWM) value to be employed for controlling brightness of light source(s) from amongst the light sources, generate control signal for setting current value and/or PWM value for light source(s), and send a control signal to controller(s). The process image(s) captured by camera(s) identify blob(s) representing light source(s) and correct estimated relative pose, based on at least one of: position, orientation, brightness, size, shape, of the blob(s).

16 Claims, 6 Drawing Sheets

ADJUSTING BRIGHTNESS OF LIGHT SOURCES OF CONTROLLER

TECHNICAL FIELD

The present disclosure relates to tracking systems incorporating adjustment of brightness of light sources of a controller. Moreover, the present disclosure relates to methods for tracking that incorporate adjustment of brightness of light sources of a controller.

BACKGROUND

Conventionally, various techniques related to head-mounted devices (HMDs) require precise real-time tracking of an input device (for example, such as a controller) that a user uses to interact with the HMDs. Some of existing controllers comprise a plurality of light-emitting elements (for example, such as light-emitting diodes (LEDs)) or other light sources that are arranged on the controllers in a way that they are at least partially visible to from a perspective of the HMD. The illumination of such light-emitting elements enables the tracking of the controller by the HMD.

However, the existing techniques for tracking the controller have several limitations associated therewith. One existing technique for tracking the controller employs light-emitting elements blinking synchronized with camera(s) in the HMD. Such blinking can have 50 Hz to 60 Hz pattern with up to 200-300 microseconds of exposure time when the light-emitting elements are on/activated. This technique requires constant and precise synchronization between the light-emitting elements and the camera(s), which is hard to implement reliably. Another existing technique involves illuminating different subsets of light-emitting elements at different times for tracking, but this technique also requires knowledge of such a manner of illuminating, heavy image processing, and involves considerable power consumption. Some other existing techniques require that each of the plurality of light-emitting elements are fully illuminated for tracking at all times. This leads to very high power consumption by the controller since the plurality of light-emitting elements consume a considerable amount of power for such full illumination. Therefore, a duration of continuous use of such a controller is quite short, and a battery life of batteries of the controller is also poor. Regular recharging of the batteries is cumbersome, and purchase of new batteries is expensive. Moreover, if the controller is far from the HMD, for example at a distance of around 1 metre from the HMD, a visibility of the light-emitting elements from the perspective of the HMD is highly compromised/reduced. As a result, an accuracy of tracking the controller is quite low and this is extremely undesirable. When results of such tracking are employed for other applications (for example, such as extended-reality applications), the user's experience of such applications is also suboptimal and compromised.

Therefore, in light of the foregoing discussion, there exists a need to overcome the aforementioned drawbacks.

SUMMARY

The aim of the present disclosure is to provide a tracking system and a method to reduce power consumption, simplify implementation, and improve accuracy of tracking a controller. The aim of the present disclosure is achieved by a tracking system and a method incorporating adjustment of brightness of light sources of a controller as defined in the appended independent claims to which reference is made to. Advantageous features are set out in the appended dependent claims.

Embodiments of the present disclosure substantially eliminate or at least partially address the aforementioned problems in the prior art, and enable accurate tracking of the at least one user-interaction controller in an efficient manner that optimizes power consumption based on a distance between the at least one user-interaction controller and the HMD. Such distance-based optimization of power consumption significantly increases a duration of continuous use and a battery life of the at least one user-interaction controller.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
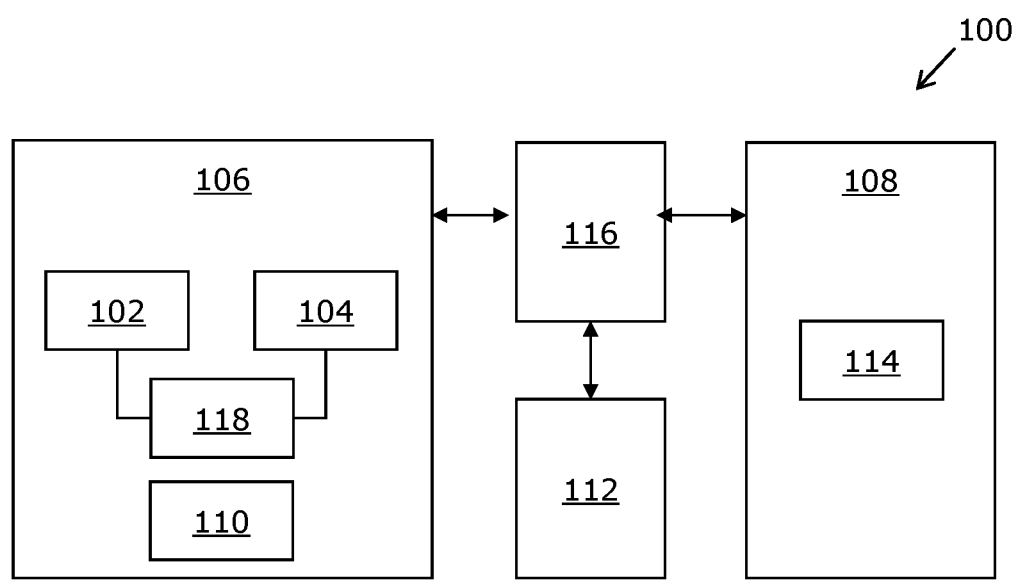
FIG. 1 illustrates a block diagram of an architecture of a tracking system, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a tracking system comprising:
a plurality of light sources arranged spatially around at least one user-interaction controller of a head-mounted device (HMD);
a controller-pose-tracking means arranged in the at least one user-interaction controller;

an HMD-pose-tracking means;
at least one camera arranged on a portion of the HMD that faces a real-world environment in which the HMD is in use; and
at least one processor configured to:
  estimate a relative pose of the at least one user-interaction controller with respect to the HMD, based on controller-pose-tracking data generated by the controller-pose-tracking means and HMD-pose-tracking data generated by the HMD-pose-tracking means;
  determine at least one of: a current value, a pulse width modulation (PWM) value to be employed for controlling a brightness of at least one light source from amongst the plurality of light sources, based on the estimated relative pose of the at least one user-interaction controller with respect to the HMD;
  generate a control signal for setting the at least one of: the current value, the PWM value for the at least one light source, and send the control signal to the at least one user-interaction controller, wherein a light source driver arranged in the at least one user-interaction controller controls the brightness of the at least one light source according to the control signal;
  process at least one image captured by the at least one camera, to identify at least one blob in the at least one image that represents the at least one light source in the real-world environment; and correct the estimated relative pose of the at least one user-interaction controller with respect to the HMD, based on at least one of: a position, an orientation, a brightness, a size, a shape, of the at least one blob in the at least one image.

In a second aspect, the present disclosure provides a method for tracking, the method comprising:
  estimating a relative pose of at least one user-interaction controller with respect to an HMD, based on controller-pose-tracking data generated by a controller-pose-tracking means arranged in the at least one user-interaction controller and HMD-pose-tracking data generated by an HMD-pose-tracking means;
  determining at least one of: a current value, a pulse width modulation (PWM) value to be employed for controlling a brightness of at least one light source from amongst a plurality of light sources arranged spatially around the at least one user-interaction controller, based on the estimated relative pose of the at least one user-interaction controller with respect to the HMD;
  generating a control signal for setting the at least one of: the current value, the PWM value for the at least one light source, and sending the control signal to the at least one user-interaction controller, wherein a light source driver arranged in the at least one user-interaction controller controls the brightness of the at least one light source according to the control signal;
  processing at least one image captured by at least one camera arranged on a portion of the HMD that faces a real-world environment in which the HMD is in use, to identify at least one blob in the at least one image that represents the at least one light source in a real-world environment; and
  correcting the estimated relative pose of the at least one user-interaction controller with respect to the HMD, based on at least one of: a position, an orientation, a brightness, a size, a shape, of the at least one blob in the at least one image.

The present disclosure provides the aforementioned tracking system and the aforementioned method for tracking. By determining the at least one of: the current value, the PWM value to be employed for the at least one light source based on the estimated relative pose (which is indicative of a distance of the at least one user-interaction controller from the HMD as well as which ones of the plurality of light sources are facing the HMD), the tracking system advantageously enables efficient distance-based power consumption for the at least one user-interaction controller. In other words, the tracking system is efficiently able to produce power savings for the at least one user-interaction controller by supplying only a specific amount of power corresponding to the (estimated) distance to the at least one light source. Moreover, beneficially, the tracking system significantly improves an accuracy and precision of tracking of the at least one user-interaction controller at longer estimated distances, as a high amount of power is supplied to the at least one light source when the at least one user-interaction controller is far away from the HMD. This is done to improve a visibility of the at least one light source in the at least one image. At smaller estimated distances, a low amount of power is supplied to the at least one light source, for enabling power savings and for prolonging battery life and a duration of continuous use. The at least one blob representing the at least one light source beneficially has a size that allows accurate tracking as well as distance-based power savings. As an example, the tracking system described herein may enable power savings of more than 50 percent. The tracking system described herein does not require any special synchronisation between the at least one light source and the at least one camera, and thus its processing steps are easy to implement. The method described herein is simple, reliable, and yields accurate tracking along with providing benefits of power saving.

Throughout the present disclosure, the term "HMD" refers to specialized equipment that is configured to present an extended-reality (XR) environment to a user when the HMD in operation is worn by the user on his/her head. In such an instance, the HMD acts as a device (for example, such as an XR headset, a pair of XR glasses, and the like) that is operable to present a visual scene of the XR environment to the user. Throughout the present disclosure, the term "extended-reality" encompasses virtual reality (VR), augmented reality (AR), mixed reality (MR), and the like.

Herein, the "tracking system" is a specialized system that enables tracking of the relative pose of the at least one user-interaction controller with respect to the HMD. Throughout the present disclosure, the term "pose" encompasses both position and orientation. Notably, the tracking system is useful for accurately tracking the relative pose of the at least one user-interaction controller with respect to the HMD, since the at least one user-interaction controller is used by the user when the HMD is in operation, to provide input(s) to the HMD. Herein, the input(s) are related to various applications for which the HMD is used. For example, the tracking system is used by the HMD to detect the input(s) given by the user, for example, related to a VR gaming application, an MR flight simulation application, an AR medical education application, or the like.

It will be appreciated that the tracking system is implemented in a manner that some of its components are arranged in the HMD (for example, inside the HMD, on the HMD, and similar) and its other components are arranged outside the HMD. In other words, the tracking system is implemented both internal to, and external to the HMD. In particular, the at least one camera is arranged on the HMD.

The HMD-pose-tracking means and the at least one processor may be arranged inside the HMD. The plurality of light sources are arranged on the at least one user-interaction controller, and the controller-pose-tracking means is arranged in the at least one user-interaction controller.

Throughout the present disclosure, the term "user-interaction controller" refers to specialized equipment that is employed by the user to interact with the HMD (and in particular, with the XR environment). Notably, the user interacts with the XR environment by providing input(s) to the HMD, via the at least one user-interaction controller. These input(s) comprise a press of a button, a tap on a touch-sensitive surface, a gesture made using the at least one user-interaction controller, and the like. The at least one user-interaction controller is communicably coupled to the HMD. Said coupling is wired, wireless, or a combination thereof. The at least one user-interaction controller is ergonomically designed to be portable, compact, and lightweight, so that the user is able to use it conveniently.

Optionally, the at least one user-interaction controller is implemented as at least one of: a keyboard, a mouse, a touchpad, a push button controller, a joystick, a gamepad, an interactive board, a tablet computer, a laptop computer, a trackball. Optionally, the at least one user-interaction controller has a curved loop portion and a stick portion coupled to the curved loop portion. The curved loop portion may have a circular shape, an elliptical shape, a pentagonal shape, a freeform shape, or similar. When the curved loop portion has the circular shape, there is provided a most optimal geometry from tracking perspectives which provides visible tracking features (i.e., the plurality of light sources) from different positions, angles and orientations.

Throughout the present disclosure, the term "light source" refers to an element from which light emanates. In other words, a light source, when activated, emits light. Optionally, the plurality of light sources are arranged spatially around the at least one user-interaction controller, on the curved loop portion of the at least one user-interaction controller. Such an arrangement may be in the form of an array, a pattern, a well-defined shape, or may be a random arrangement. Optionally, the plurality of light sources comprises at least one of: an infrared light-emitting diode, a visible-light emitting diode. It will be appreciated that other types of light sources may also be feasible. Optionally, a number of the plurality of light sources lies in a range of 5 to 30; more optionally, in a range of 15 to 30; yet more optionally, in a range of 16 to 20. The number of light sources may, for example, be from 5, 10, 15, or 20 up to 15, 20, 25, or 30.

Throughout the present disclosure, the term "controller-pose-tracking means" refers to specialized equipment that is employed to detect and/or follow the pose of the at least one user-interaction controller within the real-world environment. Pursuant to embodiments of the present disclosure, the controller-pose-tracking means is implemented as a true six Degrees of Freedom (6DoF) tracking system. Optionally, the controller-pose-tracking means tracks the pose of the at least one user-interaction controller in its local coordinate system. The controller-pose-tracking means could optionally be implemented as an internal component of the at least one user-interaction controller, as a tracking system external to the at least one user-interaction controller, or as a combination thereof. As an example, the controller-pose-tracking means may be implemented as at least one of: an accelerometer, a gyroscope, an Inertial Measurement Unit (IMU), a Timing and Inertial Measurement Unit (TIMU). As another example, the controller-pose-tracking means may be implemented as a receiver that is employed to sense signals emitted from an emitter. When the emitter is arranged in the real-world environment, the receiver is arranged on the at least one user-interaction controller, and vice-versa. Optionally, in this regard, the receiver is implemented as a sensor that, in operation, senses the emitted signals, the emitted signals being at least one of: magnetic signals, electromagnetic signals (for example, such as radio signals, visible signals (light), infrared signals, and the like), acoustic signals. Likewise, optionally, the emitter is implemented as at least one of: a magnetic signal emitter, an electromagnetic signal emitter, an acoustic signal emitter. It will be appreciated that the receiver is compatible with the emitter.

Throughout the present disclosure, the term "HMD-pose-tracking means" refers to specialized equipment that is employed to detect and/or follow a pose of the HMD within the real-world environment. Pursuant to embodiments of the present disclosure, the HMD-pose-tracking means is implemented as a true six Degrees of Freedom (6DoF) tracking system. In other words, the HMD-pose-tracking means tracks both the position and the orientation of the HMD within a three-dimensional (3D) space of the real-world environment, which can be optionally represented by a global coordinate system. In particular, the HMD-pose-tracking means is configured to track translational movements (namely, surge, heave and sway movements) and rotational movements (namely, roll, pitch and yaw movements) of the HMD within the 3D space. Optionally, the at least one processor is configured to: process the HMD-pose-tracking data to determine a pose of the HMD in its local coordinate system; and convert the pose of the HMD from said local coordinate system to the global coordinate system.

The HMD-pose-tracking means could be implemented as an internal component of the HMD, as a tracking system external to the HMD, or as a combination thereof. As an internal component of the HMD, the HMD-pose-tracking means could be implemented as at least one of: an accelerometer, a gyroscope, an Inertial Measurement Unit (IMU), a Timing and Inertial Measurement Unit (TIMU). As an internal-and-external tracking system, the HMD-pose-tracking means could be implemented as at least one detector that is employed to detect at least one detectable object. When the at least one detectable object is arranged in the real-world environment, the at least one detector is arranged on the HMD, and vice versa. Optionally, in this regard, the at least one detectable object is implemented as at least one marker (for example, such as an active infra-red (IR) LED, a visible LED, a laser illuminator, a Quick Response (QR) code, an ArUco marker, a Radio Frequency Identification (RFID) marker and the like), whereas the at least one detector is implemented as at least one of: an IR camera, an IR transceiver, a visible light camera, an RFID reader.

Throughout the present disclosure, the term "camera" refers to a device that is usable for capturing images. In use, the at least one camera captures images representing the at least one user-interaction controller in the real-world environment in which the HMD is in use. Thus, in order to properly capture light from the real-world environment, the at least one camera is arranged on the portion of the HMD that faces the real-world environment. In an implementation, the tracking system may comprise two cameras arranged at a distance from each other on an outer surface of the HMD that faces the real-world environment, said distance being equal or nearly equal to an interpupillary distance of humans. In another implementation, the tracking system may comprise four cameras, where each of the four cameras is arranged at a respective corner of an outer surface of the HMD that faces the real-world environment.

Optionally, the at least one camera is implemented as at least one visible light camera. Examples of a given visible light camera include, but are not limited to, a Red-Green-Blue-Depth (RGB), a monochrome camera. It will be appreciated that the at least one camera could be implemented as a combination of the given visible light camera and a depth camera. Examples of the depth camera include, but are not limited to, a Red-Green-Blue-Depth (RGB-D) camera, a ranging camera, a Light Detection and Ranging (LiDAR) camera, a flash LiDAR camera, a Time-of-Flight (ToF) camera, a Sound Navigation and Ranging (SONAR) camera, a laser rangefinder, a stereo camera, a plenoptic camera, an infrared camera, a structured-light scanner, and an ultrasound imaging equipment. For example, the at least one camera may be implemented as the stereo camera.

Alternatively, optionally, the at least one camera is implemented as at least one infrared light camera. It will be appreciated that a type of the at least one camera depends on a type of light emitted by the plurality of light sources upon activation. For example, when the plurality of light sources emit visible light, the at least one camera may be implemented as the at least one visible light camera, and when the plurality of light sources emit infrared light, the at least one camera may be implemented as the at least one infrared light camera.

Throughout the present disclosure, the term "processor" refers to hardware, software, firmware or a combination of these, suitable for controlling the operation of the tracking system. The at least one processor is communicably coupled with other components of the tracking system wirelessly and/or in a wired manner. It will be appreciated that the term "at least one processor" refers to "one processor" in some implementations, and "a plurality of processors" in other implementations. In some implementations, the at least one processor is implemented as a processor of the HMD. In other implementations, the at least one processor is implemented as the processor of the HMD and a processor of an external computing device, wherein the external computing device is communicably coupled with the HMD wirelessly or in a wired manner. In such a case, at least a part of all the aforementioned processing tasks of the at least one processor is performed at the processor of the external computing device. This considerably reduces processing burden on the processor of the HMD.

Throughout the present disclosure, the term "relative pose" refers to a relative position and/or a relative orientation of the at least one user-interaction controller with respect to the HMD. The relative pose is indicative of a distance at which the at least one user-interaction controller is from the HMD. Furthermore, the relative pose is indicative of which specific portion of the at least one user-interaction controller at which certain orientation, is visible from the perspective of (namely, facing) the HMD at a given point of time. Notably, use of both the controller-pose-tracking data and the HMD-pose-tracking data allows the at least one processor to know the positions and/or orientations of the at least one user-interaction controller and the HMD, respectively, and thus, enables the at least one processor to estimate the relative pose of the at least one user-interaction controller with respect to the HMD.

Optionally, when estimating the relative pose of the at least one user-interaction controller with respect to the HMD, the at least one processor is configured to:

process the controller-pose-tracking data to determine a pose of the at least one user-interaction controller in its local coordinate system;

process the HMD-pose-tracking data to determine a pose of the HMD in the global coordinate system;

convert the pose of the at least one user-interaction controller from said local coordinate system to the global coordinate system; and determine the relative pose of the at least one user-interaction controller with respect to the HMD, based on the pose of the at least one user-interaction controller in the global coordinate system and the pose of the HMD in the global coordinate system.

Optionally, the at least one processor is further configured to determine the at least one light source whose brightness is to be controlled, from amongst the plurality of light sources, based on the estimated relative pose of the at least one user-interaction controller with respect to the HMD. The estimated relative pose is indicative of which light source(s) is/are visible from a perspective of the at least one camera at any given moment of time. In other words, optionally, only a sub-set of light sources (that would be visible in the captured image) will be activated and their brightness will be controlled, based on the estimated relative pose. This sub-set comprises the at least one light source. In the tracking system, to enable accurate tracking of the at least one user-interaction controller, the at least one light source is illuminated in a manner that its illumination is well-defined and is clearly visible in the at least one image.

The at least one processor determines the at least one of: the current value, the PWM value, that needs to be employed for controlling the brightness of the at least one light source, based on the estimated relative pose, to ensure that when the at least one light source is illuminated, its illumination is well-defined and clearly visible in the at least one image. In particular, the at least one of: the current value, the PWM value is determined based on the estimated distance of the at least one user-interaction controller from the HMD. Typically, farther a light source from a camera, smaller would be a size of its blob in an image captured by the camera, and thus more difficult it would be to accurately track the user-interaction controller on which the light source is arranged. Therefore, in order to provide higher accuracy of tracking in the tracking system, farther the at least one user-interaction controller from the HMD, higher is the at least one of: the current value, the PWM value that is determined, and vice versa. This allows the brightness of the at least one light source to be such that the representation of the at least one light source in the at least one image, which is in the form of the at least one blob, has a size such that it is usable for accurately tracking the at least one user-interaction controller.

Throughout the present disclosure, the term "current value" refers to an amount of current (i.e., a magnitude of current). The current value could be expressed in terms of milliamperes, amperes, or similar. Higher the current value to be employed for controlling the brightness of the at least one light source, higher is the brightness of the at least one light source.

Throughout the present disclosure, the term "PWM value" refers to a value corresponding to a duty cycle of a PWM signal. Herein, the PWM signal is the control signal using which the brightness of the at least one light source is controllable according to some embodiments of the present disclosure. Notably, the PWM value is determined in terms of a percentage of the duty cycle, the duty cycle being directly related to the brightness of the at least one light source. For example, for an 8-bit PWM signal, if the PWM value is 127, it means that the PWM signal has a 50 percent duty cycle. In other words, it means that power is supplied for activating the at least one light source for 50 percent of time, and the power is not supplied for deactivating the at least one light source for a remaining 50 percent of the time. At the 50 percent duty cycle, if a maximum (feasible) brightness of the at least one light source is Z units, a brightness of Z/2 units is achieved. Alternatively, if the PWM value is 191 for the 8-bit PWM signal, it means that the PWM signal has a 75 percent duty cycle. At the 75 percent duty cycle, if the maximum (feasible) brightness of the at least one light source is Z units, a brightness of 3Z/4 units is achieved. Correspondingly, the PWM value of 0 corresponds to 0 percent duty cycle (and a brightness of 0 units), the PWM value of 255 for the 8-bit PWM signal corresponds to 100 percent duty cycle (and the brightness of Z units), and similar. Notably, higher the PWM value, higher the duty cycle and thus higher the brightness of the at least one light source.

Optionally, the at least one of: the current value, the PWM value to be employed for controlling the brightness of the at least one light source is determined using at least one of:

a look up table including current values corresponding to different distances between the at least one user-interaction controller and the HMD, a look up table including PWM values corresponding to different distances between the at least one user-interaction controller and the HMD, a function indicative of a manner in which at least one of: current values, PWM values vary according to a distance between the at least one user-interaction controller and the HMD.

In this regard, the term "look up table" refers to a data structure that includes corresponding values for different data categories or parameters. The look up table including the current values/the PWM values corresponding to the different distances between the at least one user-interaction controller and the HMD serves as a simple, easily accessible tool for dynamically determining accurate pose-based (and in particular, distance-based) current value and/or PWM values, when the tracking system is in operation. Optionally, when using any look up table, the at least one processor is configured to employ at least one of: an interpolation technique, an extrapolation technique, for determining the at least one of: the current value, the PWM value to be employed for controlling the brightness of the at least one light source. For example, the look up table may include the following distance-PWM value pairs: for 10 cm, PWM=30; for 30 cm, PWM=50; for 50 cm, PWM=100; for 75 cm, PWM=170; and for 100 cm, PWM=240. Then, based on the estimated relative pose, if the distance between the at least one user-interaction controller and the HMD is 30 cm, then the look up table is used to determine that the PWM value of 50 is to be employed for controlling the brightness of the at least one light source. In another case, if the distance between the at least one user-interaction controller and the HMD is 40 cm, then the interpolation technique can be employed to determine that a PWM value of 75 is to be employed for controlling the brightness of the at least one light source, based on the distance-PWM value pairs, namely, for 30 cm, PWM=50; and for 50 cm, PWM=100.

Optionally, when using the function indicative of the manner in which at least one of: current values, PWM values vary according to the distance between the at least one user-interaction controller and the HMD, the at least one processor is configured to input a value of the distance into the function and determine the at least one of: the current value, the PWM value to be employed, as an output of the function. The function may be a linear function, a non-linear function (for example, such as an exponential function), a step function, and similar. As an example, the function indicative of how the PWM values vary according to the distance between the at least one user-interaction controller and the HMD may be $F(x)=2.5x+5$, where x is the distance in centimetres, and $F(x)$ is the current value that is normalised in terms of an 8-bit value lying in a range [0, 255].

Throughout the present disclosure, the term "control signal" refers to a signal which enables setting of the at least one of: the current value, the PWM value, that is determined by the at least one processor, for the at least one light source. The control signal is received from the at least one processor by the light source driver. The light source driver is a specialized equipment that controls power provided to the at least one light source, according to the control signal, thereby resulting in controlling of the brightness of the at least one light source. Greater the power provided to a light source, greater is its brightness, and vice versa. Optionally, a type of the light source driver in the at least one user-interaction controller depends on a type of the plurality of light sources that are arranged on the at least one user-interaction controller. For example, the plurality of light sources may be implemented as infrared LEDs and the light source driver may be implemented as an infrared LED driver.

In an implementation, the control signal comprises an exact current value and/or an exact PWM value to be employed. In another implementation, the control signal comprises a particular level of the brightness of the at least one source at which light is to be emitted. The particular level of brightness is suitable for accurate tracking. Herein, the light source driver uses the value of the particular level of brightness to deduce the at least one of: the current value, the PWM value that is to be employed. In yet another implementation, the control signal comprises a code that indicates the particular level of brightness, or the like, where the light source driver uses the value of the code to deduce the at least one of: the current value, the PWM value that is to be employed. The control signal is sent from the at least one processor to the at least one user-interaction controller (and in particular, to the light source driver) via a wired communication means and/or a wireless communication means.

Notably, when the at least one user-interaction controller comprises a plurality of user-interaction controllers having different estimated relative poses with respect to the HMD, different control signals are generated and employed for different user-interaction controllers. The different user-interaction controllers may be arranged on/held by different body parts of the user and may therefore have the different estimated relative poses since the different body parts may move differently. Moreover, the different control signals beneficially enable to efficiently distinguish between the different user-interaction controllers. The tracking system is beneficially capable of tracking more than one user-interaction controller by using the respective different control signals for each respective user-interaction controller. For example, when the plurality of user-interaction controllers comprise a first user-interaction controller and a second user-interaction controller, wherein an arrangement of a first plurality of light sources on the first user-interaction controller is different from an arrangement of a second plurality of light sources on the second user-interaction controller, the first user-interaction controller may be held in a left hand or may be worn around a left wrist of the user, whereas the second user-interaction controller may be held in a right hand or may be worn on a right wrist of the user. The user may move his/her hands/wrists differently, and thus the first user-interaction controller and the second user-interaction controller are tracked separately using different control signals.

Notably, the at least one image is captured by the at least one camera after the at least one light source is illuminated at the brightness which is controlled using the control signal. Herein, the at least one image is indicative of an actual relative pose of the at least one user-interaction controller with respect to the HMD. The "actual relative pose" refers to an actual relative position and/or an actual relative orientation of the at least one user-interaction controller with respect to the HMD. The actual relative pose is indicative of an actual distance at which the at least one user-interaction controller is from the HMD, in the real-world environment. It will be appreciated that the actual relative pose may be different from the estimated relative pose, and thus the at least one image is captured and processed in order to correct the estimated relative pose for obtaining the actual relative pose.

Throughout the present disclosure, a "blob" refers to a set of pixels that collectively represent a light source in the at least one image. The set of pixels has a distinct shape and is distinguishable from its surrounding pixels. Typically, one blob represents one light source. Optionally, when processing the at least one image to identify the at least one blob, the at least one processor is configured to employ at least one blob-detection algorithm. The at least one blob-detection algorithm is a specialized image processing algorithm for detecting blobs. The at least one blob-detection algorithm includes at least one of: a Laplacian of Gaussian (LoG)-based blob detector, a Difference of Gaussians (DoG)-based blob detector, a Maximally Stable Extremal Regions (MSER) blob detector. It will be appreciated that other image processing algorithms (such as image sharpening, de-noising, cropping, and the like) may also be employed when processing the at least one image.

It will be appreciated that the at least one blob is associated with at least one parameter such as at least one of: the position, the orientation, the brightness, the size, the shape, of the at least one blob. The "position" of the at least one blob indicates where the at least one blob is located in the at least one image and may be expressed in terms of at least one of pixel coordinates of a centre of the at least one blob, pixel coordinates of extreme points on an edge of the at least one blob, or similar. The "orientation" of the at least one blob indicates how the at least one blob is aligned in the at least one image and may be expressed in terms of at least one of an angle between a reference direction and a major axis of the at least one blob, a vector indicative of the major axis of the at least one blob, an orientation of a major principal component of the at least one blob, or similar. The "brightness" of the at least one blob is a level of light or intensity of the set of pixels constituting the at least one blob and may be expressed in terms of at least one of a mean intensity of the set of pixels constituting the at least one blob, a median intensity of the set of pixels, a total intensity of the set of pixels, an intensity histogram that shows a distribution of pixel intensities within the at least one blob, or similar. The "size" of the at least one blob is indicative of how big or small the at least one blob is and is expressed in terms of at least one of: a total number of the set of pixels constituting the at least one blob, an area covered by the at least one blob in terms of square pixels, a number of pixels along a largest dimension of the at least one blob, or similar. For example, the at least one blob may comprise three different blobs whose size is expressed as the number of pixels lying along their respective diameters. In such a case, the sizes of the three different blobs may be three pixels, five pixels, and seven pixels. The "shape" of the at least one blob may be one of a circle, an ellipse, a regular polygon, an irregular polygon, a star shape, a freeform shape, or similar.

Values of the brightness and/or the size of the at least one blob depend on the at least one of: the current value, the PWM value, that is employed for the at least one light source. In this regard, greater the at least one of: the current value, the PWM value, that is employed for the at least one light source, greater is the value of the brightness and/or the size of the at least one blob, and vice versa. For example, when the current value employed is 35 milliamperes (mA), the size of the at least one blob may be seven pixels of blob diameter and the brightness of the at least one blob may be 20 lumens. On the other hand, when the current value employed is 45 mA and the estimated relative pose is unchanged, the size of the at least one blob may be 9 pixels of blob diameter and the brightness of the at least one blob may be 32 lumens.

Notably, the at least one parameter associated with the at least one blob is used as a basis for correcting the estimated relative pose of the at least one user-interaction controller with respect to the HMD. The corrected relative pose is the actual relative pose of the at least one user-interaction controller with respect to the HMD. Herein, the correction of the estimated relative pose may be implemented by making coarse adjustments and/or fine adjustments in the estimated relative pose. Upon making such adjustments, the estimated position and/or the estimated orientation of the at least one user-interaction controller with respect to the HMD get corrected to yield the actual position and/or the actual orientation of the at least one user-interaction controller with respect to the HMD. This further indicates an actual distance of the at least one user-interaction controller from the HMD, based on the actual relative pose. The at least one of: the position, the orientation, the brightness, the size, the shape, of the at least one blob is used for such correction since such parameters are visible in the at least one image that indicates the actual relative pose.

Optionally, when correcting the estimated relative pose of the at least one user-interaction controller with respect to the HMD, the at least one processor is configured to employ at least one of: the look up table including the current values, the look up table including the PWM values, the function. Optionally, when employing any look up table for correction, the at least one processor is configured to employ at least one of: an interpolation technique, an extrapolation technique, for determining the actual position and/or the actual orientation of the at least one user-interaction controller with respect to the HMD.

In an example, the estimated relative pose may indicate that the estimated distance of the at least one user-interaction controller from the HMD is 30 cm. Then, a PWM value of 80 (for 8-bit PWM) may be supplied to the at least one light source. In the at least one image, a blob representing a light source of the at least one user-interaction controller is estimated to have a size of 10 pixels of blob diameter, for the PWM value of 80, based on the estimated distance. However, in the at least one image, the size of the blob may be determined to actually be 9 pixels of blob diameter. In other words, the estimated size of the blob is larger than an actual size of the blob. This means that the at least one image indicates that the actual distance of the at least one user-interaction controller from the HMD is greater than the estimated distance. In such a case, based on the actual size of the blob, the estimated relative pose is corrected to yield the actual relative pose. Based on the actual relative pose, the actual distance of the at least one user-interaction controller from the HMD may be determined, for example, as 35 cm.

Optionally, the at least one processor is further configured to update the at least one of: the look up table including the current values, the look up table including the PWM values, the function, based on the at least one of: the current value, the PWM value employed for the at least one light source, and the corrected relative pose of the at least one user-interaction controller with respect to the HMD. In this regard, the corrected relative pose (i.e., the actual relative pose determined by correcting the estimated relative pose) is indicative of the actual distance between the at least one user-interaction controller and the HMD. Subsequently, the at least one of: the current value, the PWM value, corresponding to this actual distance between the at least one user-interaction controller and the HMD, and the actual distance itself, are used to make updates and/or corrections in the at least one of: the look up table including the current values, the look up table including the PWM values, the function, because such current/PWM value(s) and the actual distance constitute actual relevant measurement data pertaining to tracking of the at least one user-interaction controller. Thus, advantageously, the accuracy and relevancy of the at least one of: the look up table including the current values, the look up table including the PWM values, the function, is significantly increased. This facilitates subsequent up-to-date accurate tracking using the tracking system.

Optionally, the at least one processor of the tracking system is further configured to send the corrected estimated relative pose to the processor of the HMD, wherein the processor of the HMD is configured to generate at least one XR image that is to be displayed at the HMD, based on the corrected estimated relative pose. Optionally, the HMD comprises at least one display and/or projector for displaying the at least one XR image.

Optionally, the at least one of: the current value, the PWM value to be employed for the at least one light source is determined such that the size of the at least one blob in the at least one image lies in a predefined range. When the size of the at least one blob lies in the predefined range, it means that the size of the at least one blob is suitable to enable distance-based power optimization and high tracking accuracy to be achieved by the tracking system. The predefined range serves as a size target indicator for the at least one blob. The size of the at least one blob being in the predefined range corresponds to the at least one light source being illuminated in a manner that its illumination is well-defined and clearly visible in the at least one image. Therefore, the at least one of: the current value, the PWM value to be employed is optionally determined to meet the above condition. Beneficially, in such a case, excessive power is not supplied to the at least one light source, yet the at least one light source is adequately visible (as the at least one blob) in the at least one image to be tracked accurately. Accuracy of tracking is the most important consideration, and causing the size of the at least one blob to be in the predefined range provides an additional benefit of power saving along with the accuracy of tracking.

It will be appreciated that requirements for the size of the at least one blob are guided by underlying computer vision algorithms (such as image processing algorithms) used for processing the at least one image. For higher blob sizes, more data is required to be processed by said algorithms.

Optionally, the at least one processor is further configured to select the predefined range based on at least one of: a type of the controller-pose-tracking means, a type of the HMD-pose-tracking means, a configuration of the at least one camera, computational resources available to the at least one processor, a tracking accuracy of the tracking system.

Optionally, the predefined range is 5 to 30 pixels of blob diameter; more optionally, 5 to 20 pixels of blob diameter; yet more optionally, 5 to 10 pixels of blob diameter. The predefined range may, for example, be from 5, 10, 15, or 20 pixels of blob diameter up to 15, 20, 25, or 30 pixels of blob diameter. This predefined range beneficially provides a reasonable balance between power savings and tracking accuracy. It will be appreciated the predefined range may be different for different terms in which the size of the at least one blob is expressed.

Optionally, the at least one processor is further configured to generate the look up table and/or the function, and wherein when generating the look up table and/or the function, the at least one processor is configured to.

notify the user to hold the at least one user-interaction controller at a plurality of distances from the HMD, wherein when the at least one user-interaction controller is held at a given distance, a plurality of control signals for setting a corresponding plurality of current values and/or a plurality of PWM values are employed for controlling the brightness of the plurality of light sources;

receive test images captured for the plurality of current values and/or the plurality of PWM values corresponding to the given distance, wherein the test images include one or more blobs representing one or more light sources from amongst the plurality of light sources;

determine whether a size of the one or more blobs lies in the predefined range;

when is it determined that the size of the one or more blobs lies in the predefined range, include corresponding current values and/or PWM values, and the given distance, in a dataset from which the look up table and/or the function is to be generated; and generate the look up table using the dataset and/or generate the function by identifying a relationship between current values and/or or PWM values and their corresponding distances in the dataset.

In this regard, the at least one processor optionally notifies the user via at least one of: a message displayed on a display screen of the HMD, an audio message played using a speaker of the HMD or a speaker coupled to the HMD. Notably, by capturing and analysing test images corresponding to the given distance, the at least one processor is able to determine which of the current values and/or the PWM values for the given distance, from amongst the plurality of the current values and/or the PWM values employed for the given distance, are to be included in the look-up table. The test images that are indicative of the size of the one or more blobs, are analyzed to determine for which of the corresponding current values and/or the PWM values, the size of the one or more blobs lies in the predefined range. Once a given blob is determined to have a size in the predefined range, it means that the size of the given blob is suitable for accurate tracking of a light source that the given blob represents, and thus the corresponding current values and/or PWM values, and the given distance, corresponding to such a suitable size of the given blob are added to the dataset. The dataset thus serves as a useful ready reference for generation of the look up table and/or the function. Optionally, the at least one processor employs a machine learning algorithm for generating the function using the dataset.

Optionally, the at least one processor is further configured to:
- determine whether the size of the at least one blob is greater than a predefined maximum size; and
- when it is determined that the size of the at least one blob is greater than the predefined maximum size, decrease the at least one of: the current value, the PWM value for the at least one light source.

In this regard, if it is determined that the size of the at least one blob is greater than the predefined maximum size, then it means that the power which is being supplied to the at least one light source, based on the control signal, is more than what is required for accurately tracking the at least one user-interaction controller. In other words, such determination means that the control signal causes large-sized blob(s) to be captured in the at least one image. Subsequently, the at least one of: the current value, the PWM value for the at least one light source is decreased to ensure that only a minimum required power is supplied to the at least one light source. Upon such decreasing, the size of the at least one blob in at least one next image would now be lesser than the predefined maximum size. Optionally, upon decreasing the at least one of: the current value, the PWM value for the at least one light source, the size of the at least one blob in at least one next image lies in the predefined range. Optionally, the predefined maximum size is a highest value (i.e., an uppermost limit) of the predefined range. Advantageously, a power consumption of the at least one light source is reduced without compromising on tracking accuracy. Furthermore, in this case, a battery life of the at least one user-interaction controller is increased.

As an example, the PWM value of 255 (for 8-bit PWM) may be provided for the estimated distance of 110 centimetres (or 1.1 metre) so that the size of the at least one blob is equal to 6 pixels of blob diameter. The predefined maximum size may, for example, be equal to 20 pixels of blob diameter. If the same PWM value of 255 were provided for an alternative estimated distance of 20 centimetres (or 0.2 metre), the size of the at least one blob may become greater than 20 pixels of blob diameter, which is too big and is not really needed. In such a case, the PWM value can be decreased, for example, to be equal to 35, to achieve the size of the at least one blob as 8 pixels of blob diameter. This achieves considerable power savings in the tracking system without compromising on tracking accuracy.

Optionally, the at least one processor is further configured to:
- determine whether the size of the at least one blob is smaller than a predefined minimum size; and
- when it is determined that the size of the at least one blob is smaller than the predefined minimum size, increase the at least one of: the current value, the PWM value for the at least one light source.

In this regard, if it is determined that the size of the at least one blob is lesser than the predefined minimum size, then it means that the power which is being supplied to the at least one light source, based on the control signal, is less than what is required for accurately tracking the at least one user-interaction controller. In other words, such determination means that the control signal causes too small-sized blob(s) to be captured in the at least one image. Subsequently, the at least one of: the current value, the PWM value for the at least one light source is increased to ensure that at least a minimum required power for accurate tracking is supplied to the at least one light source. Upon such increasing, the size of the at least one blob in at least one next image would now be more than the predefined minimum size. Optionally, upon increasing the at least one of: the current value, the PWM value for the at least one light source, the size of the at least one blob in at least one next image lies in the predefined range. Optionally, the predefined minimum size is a lowest value (i.e., a bottommost limit) of the predefined range. Advantageously, by such adjustment, the tracking system ensures that the size of the at least one blob in the at least one image is greater than the predefined minimum size and thus is sufficient enough to enable accurate tracking of the at least one user-interaction controller at all times.

As an example, the current value of 50 mA may be provided for the estimated distance of 50 centimetres (or 0.5 metre) so that the size of the at least one blob is equal to 10 pixels of blob diameter. The predefined minimum size may, for example, be equal to 5 pixels of blob diameter. If the same current value of 50 mA is provided for an alternative estimated distance of 100 centimetres (or 1 metre), the size of the at least one blob may become lesser than 5 pixels of blob diameter, which is too small and can lead to tracking inaccuracies. In such a case, the current value can be increased, for example, to be equal to 145 mA, to achieve the size of the at least one blob as 7 pixels of blob diameter at the alternative estimated distance of 100 cm. This achieves tracking accuracy in the tracking system along with considerable power savings.

Optionally, the at least one processor is further configured to:
- process the at least one next image captured by the at least one camera, to identify the at least one blob representing the at least one light source in the at least one next image; and iteratively correct the estimated relative pose of the at least one user-interaction controller with respect to the HMD, based on the at least one of: the position, the orientation, the brightness, the size, the shape, of the at least one blob in the at least one next image.

The term "next image" refers to an image captured by the at least one camera after the estimated relative pose of the at least one user-interaction controller with respect to the HMD has been corrected at least once. It will be appreciated that a sequence of images are captured by the at least one camera for continuously tracking the at least one user-interaction controller. In the at least one next image, the size of the at least one blob is such that it enables both power saving and accurate tracking in the tracking system. Therefore, advantageously, the estimated relative pose is iteratively corrected using the at least one next image until the estimated relative pose matches the actual relative pose.

Optionally, the at least one processor is further configured to:
- generate a reset control signal for setting at least one of: a maximum current value, a maximum PWM value for each of the plurality of light sources, and send the reset control signal to the at least one user-interaction controller, wherein the light source driver arranged in the at least one user-interaction controller controls the brightness of each of the plurality of light sources according to the reset control signal;
- process at least one reset image captured by the at least one camera, to identify one or more blobs in the at least one reset image that represent one or more light sources from amongst the plurality of light sources in the real-world environment; and estimate a relative pose of the at least one user-interaction controller with respect to the HMD, based on at least one of: a position, an orientation, a brightness, a size, a shape of each of the one or more blobs in the at least one reset image.

In this regard, the term "reset control signal" refers to the control signal that is generated in a scenario when the tracking system loses track of the at least one user-interaction controller and needs to be operated in a reset mode for re-starting tracking of the at least one user-interaction controller. The scenario when the tracking system needs to operate in the reset mode occurs when any operation or component of the tracking system malfunctions, or when the at least one camera loses a track of the at least one light source (i.e., the at least one camera is unable to capture the at least one light source in the at least one image), and similar. In such a scenario, the tracking of the at least one user-interaction controller is halted and may cause issues with provisioning of visual experiences based on such tracking. Optionally, the at least one processor is configured to generate the reset control signal when the at least one image does not include any blobs. Therefore, when the at least one of: the maximum current value, the maximum PWM value is employed for each of the plurality of light sources, each of the plurality of light sources are illuminated to emit a maximum brightness of light, and thus the one or more light sources from amongst the plurality of light sources would be visible in the at least one reset image.

Throughout the present disclosure, the term "reset image" refers to an image that is captured after the tracking system is operated in the reset mode. Notably, to resume the tracking of the at least one user-interaction controller, the tracking system captures and processes the at least one reset image to identify the one or more blobs representing the one or more light sources that are visible from a perspective of the at least one camera, after the tracking system is operated in the reset mode. The one or more of blobs identified in the at least one reset image, and the at least one of: the position, the orientation, the brightness, the size, the shape, of each of the one or more blobs, which is visible in the at least one reset image, are indicative of the relative position and/or the relative orientation of the at least one user-interaction controller with respect to the HMD. This relative pose of the at least one user-interaction controller with respect to the HMD could be a new estimation of the relative pose, or a correction of a previously-estimated relative pose. Furthermore, this relative pose of the at least one user-interaction controller with respect to the HMD is also indicative of an estimated distance of the at least one user-interaction controller from the HMD. Thus, advantageously, the tracking system is able to reset illumination of the plurality of light sources and resume the tracking of the at least one user-interaction controller.

Optionally, the light source driver (arranged in the at least one user-interaction controller) is configured to control a first light source of the at least one user-interaction controller based on a first current value and/or a first PWM value, so as to illuminate the first light source to have a brightness equal to a first intensity, wherein the at least one camera is employed to capture a first image representing the first light source, and the at least one processor is configured to: process the first image to identify a first blob representing the first light source; determine a size of the first blob, and determine a distance of the at least one user-interaction controller from the HMD based on the size of the first blob and the first intensity. It will be appreciated that such processing can be performed for various numbers of light sources of various numbers of user-interaction controllers.

The present disclosure also relates to the method for tracking as described above. Various embodiments and variants disclosed above, with respect to the aforementioned tracking system, apply mutatis mutandis to the method.

Optionally, in the method, the at least one of: the current value, the PWM value to be employed for the at least one light source is determined such that the size of the at least one blob in the at least one image lies in a predefined range.

Optionally, the method further comprises:
determining whether the size of the at least one blob is greater than a predefined maximum size; and
when it is determined that the size of the at least one blob is greater than the predefined maximum size, decreasing the at least one of: the current value, the PWM value for the at least one light source.

Optionally, the method further comprises:
determining whether the size of the at least one blob is smaller than a predefined minimum size; and
when it is determined that the size of the at least one blob is smaller than the predefined minimum size, increasing the at least one of: the current value, the PWM value for the at least one light source.

Optionally, in the method, the at least one of: the current value, the PWM value to be employed for controlling the brightness of the at least one light source is determined using at least one of:
a look up table including current values corresponding to different distances between the at least one user-interaction controller and the HMD,
a look up table including PWM values corresponding to different distances between the at least one user-interaction controller and the HMD,
a function indicative of a manner in which at least one of: current values, PWM values vary according to a distance between the at least one user-interaction controller and the HMD.

Optionally, the method further comprises updating the at least one of: the look up table including the current values, the look up table including the PWM values, the function, based on the at least one of: the current value, the PWM value employed for the at least one light source, and the corrected relative pose of the at least one user-interaction controller with respect to the HMD.

Optionally, the method further comprises:
generating a reset control signal for setting at least one of: a maximum current value, a maximum PWM value for each of the plurality of light sources, and sending the reset control signal to the at least one user-interaction controller, wherein the light source driver arranged in the at least one user-interaction controller controls the brightness of each of the plurality of light sources according to the reset control signal;
processing at least one reset image captured by the at least one camera, for identifying one or more blobs in the at least one reset image that represent one or more light sources from amongst the plurality of light sources in the real-world environment; and
estimating a relative pose of the at least one user-interaction controller with respect to the HMD, based on at least one of: a position, an orientation, a brightness, a size, a shape of each of the one or more blobs in the at least one reset image.

DETAILED DESCRIPTION OF THE DRAWINGS

Referring to FIG. 1, illustrated is a block diagram of an architecture of a tracking system 100, in accordance with an embodiment of the present disclosure. The tracking system 100 comprises a plurality of light sources (depicted as light sources 102 and 104) arranged spatially around at least one user-interaction controller (depicted as a user-interaction controller 106) of a head-mounted device (HMD) 108, a controller-pose-tracking means 110 arranged in the user-interaction controller 106, an HMD-pose-tracking means 112, at least one camera (depicted as a camera 114) arranged on a portion of the HMD 108 that faces a real-world environment in which the HMD 108 is in use, and at least one processor (depicted as a processor 116). The processor 116 is communicably coupled to the controller-pose-tracking means 110, the HMD-pose-tracking means 112, the camera 114, and a light source driver 118 arranged in the user-interaction controller 106. The processor 116 is configured to perform various operations as described earlier.

It may be understood by a person skilled in the art that the FIG. 1 includes a simplified block diagram of the tracking system 100 for sake of clarity, which should not unduly limit the scope of the claims herein. The person skilled in the art will recognize many variations, alternatives, and modifications of embodiments of the present disclosure. For example, one or more elements of the tracking system 100 (such as the HMD-pose-tracking means 112 and/or the processor 116) may be arranged in the HMD 108.

Figure 2A:
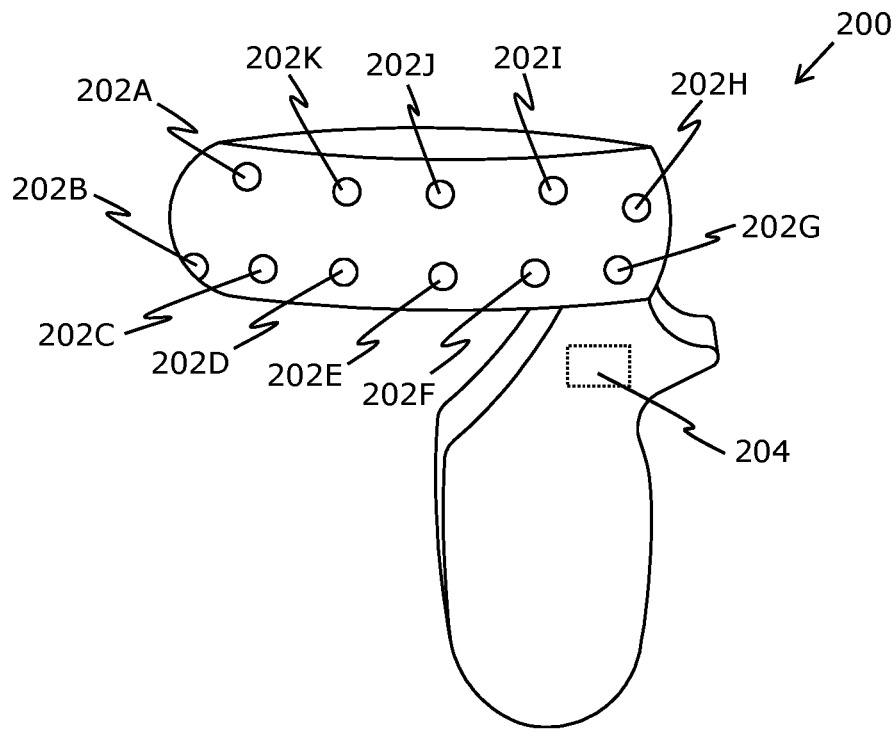
FIGS. 2A and 2B illustrate a side perspective view and a front perspective view, respectively, of a user-interaction controller, in accordance with an embodiment of the present disclosure.
Figure 2B:
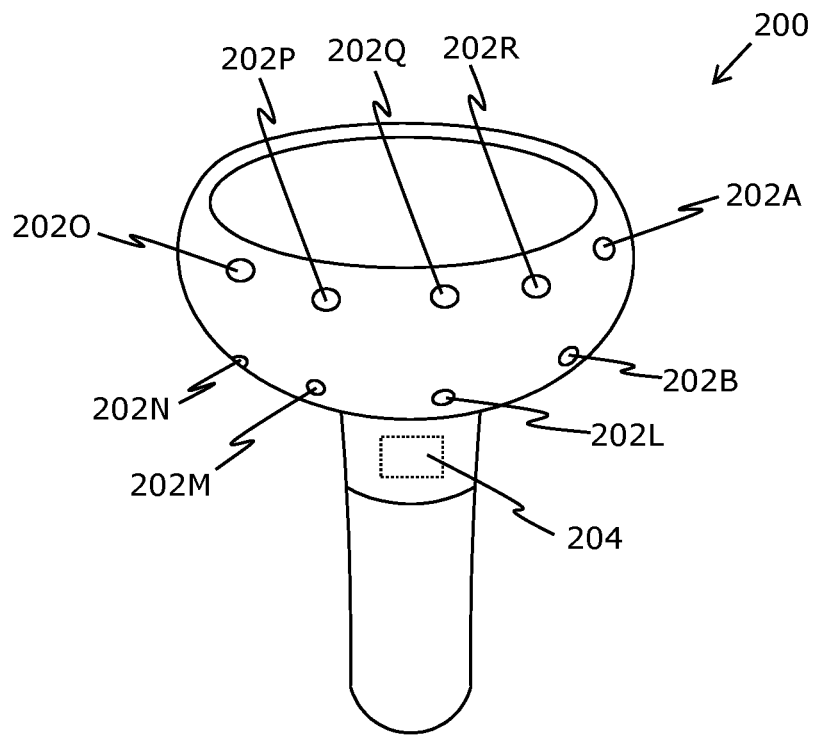

Referring to FIGS. 2A and 2B, illustrated are a side perspective view and a front perspective view, respectively, of a user-interaction controller 200, in accordance with an embodiment of the present disclosure. The user-interaction controller 200 comprises a plurality of light sources (depicted as light sources 202A, 2026, 202C, 202D, 202E, 202F, 202G, 202H, 202I, 202J, and 202K that are visible in FIG. 2A, and as light sources 202A, 2026, 202L, 202M, 202N, 202O, 202P, 202Q, and 202R that are visible in FIG. 2B) spatially arranged around the user-interaction controller 200. As shown, for example, the light sources 202A-202R are arranged along a curved loop portion of the user-interaction controller 200. The user-interaction controller 200 also comprises a controller-pose-tracking means 204.

It may be understood by a person skilled in the art that the FIGS. 2A and 2B represent the side perspective view and the front perspective view, respectively, of the user-interaction controller 200 for sake of clarity, which should not unduly limit the scope of the claims herein. It is to be understood that the views of the user-interaction controller 200 are provided as examples and are not to be construed as limiting it to specific numbers or types of light sources, or to specific designs of the user-interaction controller 200, or similar. The person skilled in the art will recognize many variations, alternatives, and modifications of embodiments of the present disclosure. For example, the controller-pose-tracking means 204 may be arranged at different place in the user-interaction controller 200.

Figure 3:
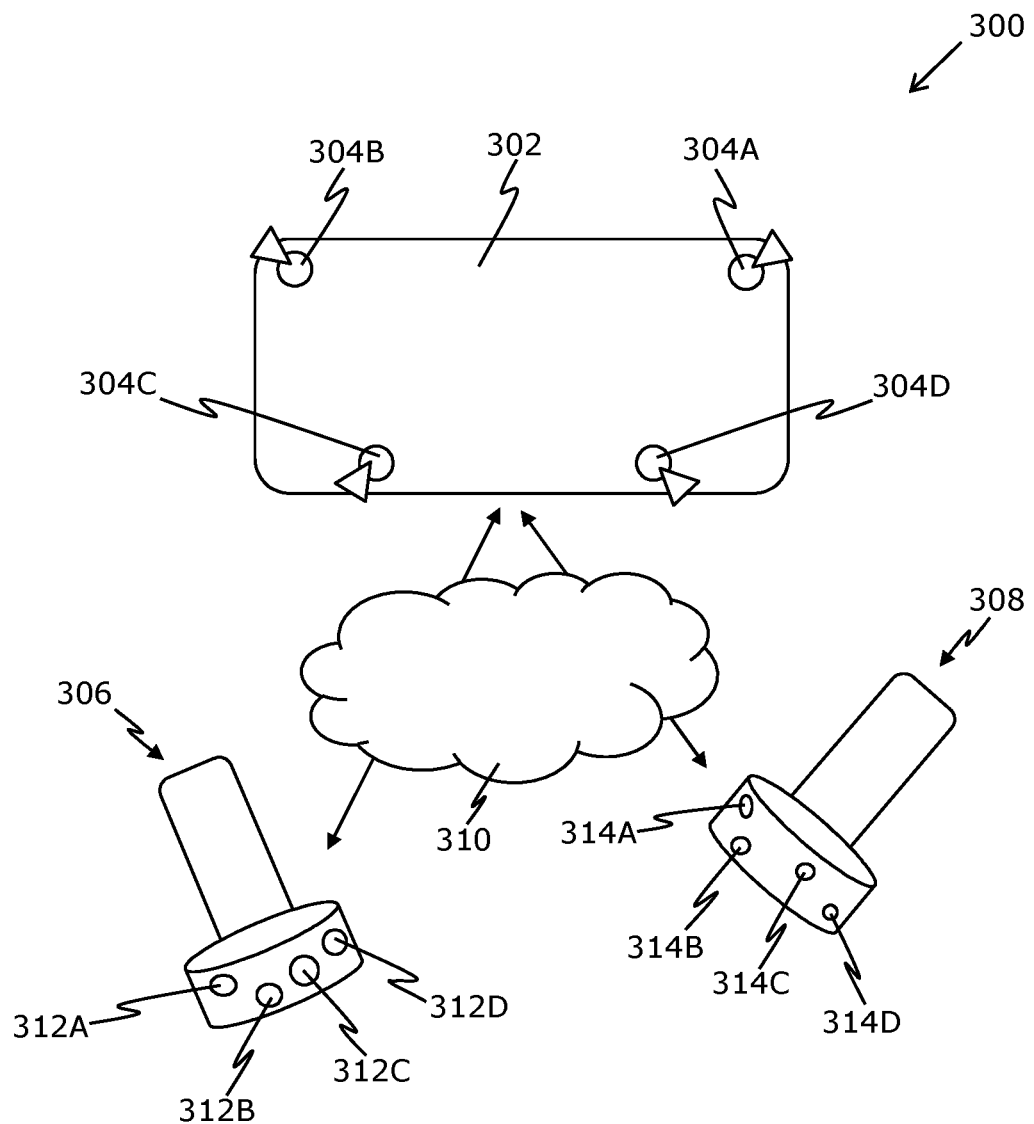
FIG. 3 is a schematic illustration of a tracking system in use, in accordance with an embodiment of the present disclosure.

Referring to FIG. 3, illustrated is a schematic illustration of a tracking system 300 in use, in accordance with an embodiment of the present disclosure. Herein, a head-mounted device (HMD) 302 is shown to comprise a plurality of cameras (depicted as cameras 304A, 304B, 304C and 304D). Moreover, the HMD 302 is communicably coupled to a first user-interaction controller 306 and a second user-interaction controller 308 via a radio communication interface 310, for example. Herein, the first user-interaction controller 306 comprises a first plurality of light sources (depicted as light sources 312A, 312B, 312C, and 312D, which are collectively referenced as 312A-D). Herein, the second user-interaction controller 308 comprises a second plurality of light sources (depicted as light sources 314A, 3148, 314C, and 314D, which are collectively referenced as 314A-D). The cameras 304A-D capture at least one image that is processed by at least one processor (not shown) to identify at least one blob in the at least one image that represents at least one light source in the real-world environment. Moreover, a size of at least one blob for at least one light source amongst the light sources 312A-D is smaller in comparison to a size of at least one blob for at least one light source amongst the light sources 314A-D, as a distance of the first user-interaction controller 306 from the HMD 302 is greater than a distance of the second user-interaction controller 308 from the HMD 302, as shown in FIG. 3.

Figure 4A:
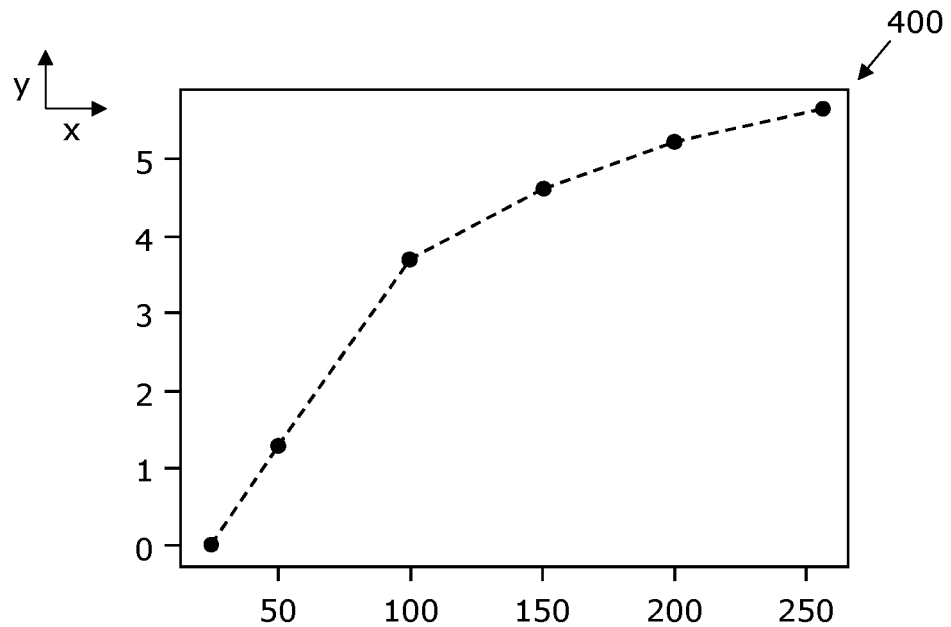
FIG. 4A is a graphical representation of how a size of a blob representing a light source in an image varies with respect to a current value employed for controlling a brightness of the light source, in accordance with an embodiment of the present disclosure.

Referring to FIG. 4A, illustrated is a graphical representation 400 of how a size of a blob representing a light source in an image varies with respect to a current value employed for controlling a brightness of the light source, in accordance with an embodiment of the present disclosure. For example, the size of the blob (depicted along a y-axis, for example, in terms of millimetres) increases non-linearly with an increase in the current value (depicted along an x-axis). As shown, the current value may, for example, be depicted as an 8-bit value within a range [0, 255].

Such a range may be selected to normalise the current value lying between a minimum current value (namely, 0 milliampere) and a maximum current value available according to a technical specification of the light source.

Figure 4B:
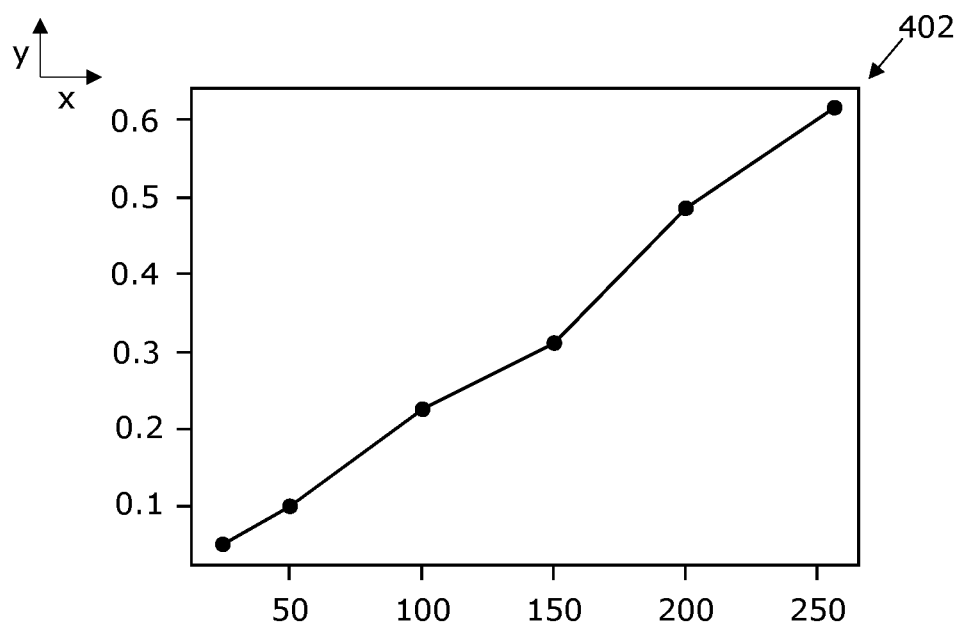
FIG. 4B is a graphical representation of how an intensity of light emitted by a light source varies with respect to a current value employed for controlling a brightness of the light source, in accordance with an embodiment of the present disclosure.

Referring to FIG. 4B, illustrated is a graphical representation 402 of how an intensity of light emitted by a light source varies with respect to a current value employed for controlling a brightness of the light source, in accordance with an embodiment of the present disclosure. For example, the intensity of the light (depicted along a y-axis, for example, in terms of milliwatts) increases, for example, nearly linearly with an increase in the current value (depicted along an x-axis, for example, as an 8-bit value within a range [0, 255]).

It may be understood by a person skilled in the art that the FIGS. 4A and 4B are merely examples for sake of clarity, which should not unduly limit the scope of the claims herein. The person skilled in the art will recognize many variations, alternatives, and modifications of embodiments of the present disclosure. For example, the current value depicted along the x-axes in FIGS. 4A and 4B may be a light-source-specific current setting. The light-source-specific current setting may be determined, by a light source driver, as an output current value to be employed to control the brightness of the light source. As an example, current control may be linear, and the output current value of the light source may be determined using the following equation:

$$I_{out(peak)} = (343/R_{iset}) * (GCC/256) * (SL/256)$$

where $I_{out(peak)}$ is the (peak) output current value to be employed for the light source, $R_{iset}$ is a resistance, GCC is a global current setting, and SL is the light-source-specific current setting. As an example, the $R_{iset}$ may be equal to 10 kilo-ohm(kohm), GCC may be equal to 255, SL may be the 8-bit value (that depicts the current value) lying in a range of 0 to 255. In such a case, when the SL is equal to its maximum possible value which is 255, a maximum (peak) output current value of the light source driver may be equal to 34 milliamperes, according to the above-mentioned equation.

Figure 5A:
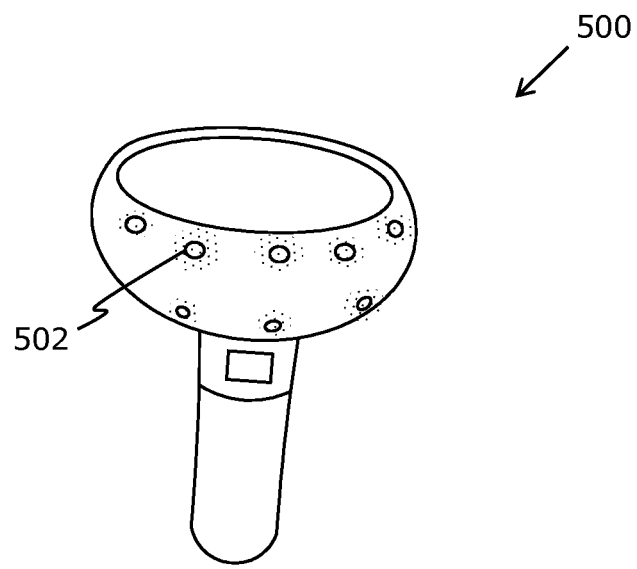
FIGS. 5A and 5B are schematic illustrations of how a brightness of a light source is controlled, in accordance with an embodiment of the present disclosure.
Figure 5B:
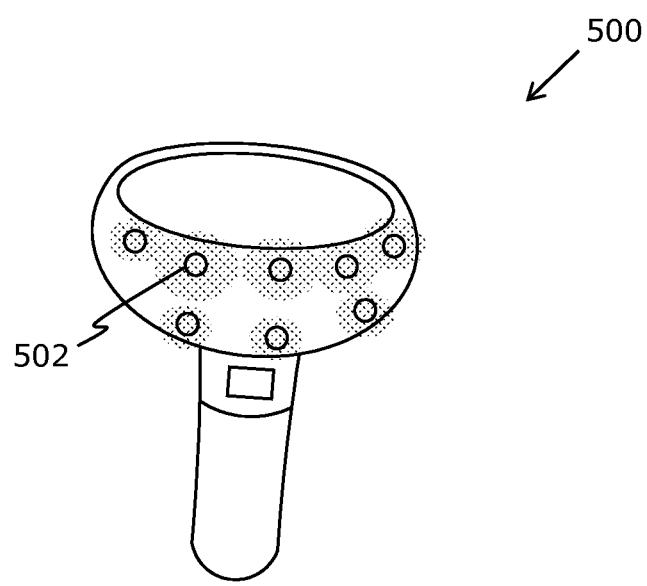

Referring to FIGS. 5A and 5B, illustrated are schematic illustrations of how a brightness of a light source 502 is controlled, in accordance with an embodiment of the present disclosure. In FIGS. 5A and 5B, there is shown a user-interaction controller 500 having a plurality of light sources arranged spatially around it. For sake of simplicity, controlling the brightness of one light source (such as the light source 502) from amongst the plurality of light sources is described here. It will be appreciated that other light sources can be controlled similarly. Notably, at least one of: a current value, a pulse width modulation (PWM) value, is to be employed for controlling the brightness of the light source 502, based on an estimated relative pose of the user-interaction controller 500 with respect to a head-mounted device (HMD) (not shown).

In FIG. 5A, let us consider that the user-interaction controller 500 is at a distance of 30 cm from the HMD. Then, for example, the PWM value of 50 (for 8-bit PWM) may be employed so that a level L1 of the brightness of the light source 502 is achieved. This level L1 of brightness is depicted as a sparse small-sized dotted hatching around the light source 502 in FIG. 5A.

In a first exemplary scenario, if a higher PWM value is employed at the distance of 30 cm, for example, the PWM value of 255 is employed, a level L2 of the brightness of the light source 502 is achieved as shown in FIG. 5B. This level L2 of brightness is depicted as a dense large-sized dotted hatching around the light source 502 in FIG. 5B. When, for example, a first image and a second image are captured corresponding to the levels L1 and L2 of brightness according to FIGS. 5A and 5B, respectively, a size of a blob representing the light source 502 in the second image would be greater than a size of a blob representing the light source 502 in the first image.

In a second exemplary scenario, the user-interaction controller 500 is moved to a distance of 110 cm from the HMD. Then, for example, the PWM value of 255 may be employed so that a level L2 of the brightness of the light source 502 as shown in FIG. 5B is obtained at the 110 cm distance, in order to achieve a tracking accuracy that is comparable to a tracking accuracy achieved with the level L1 of brightness of FIG. 5A at 30 cm distance. This level L2 of brightness is depicted as a dense large-sized dotted hatching around the light source 502 in FIG. 5B. When, for example, a first image and a second image are captured corresponding to the levels L1 and L2 of brightness according to FIGS. 5A and 5B, at distances of 30 cm and 110 cm respectively, a size of a blob representing the light source 502 in the second image would be comparable to (i.e., similar to) a size of a blob representing the light source 502 in the first image.

It may be understood by a person skilled in the art that the FIGS. 5A and 5B are merely examples for sake of clarity, which should not unduly limit the scope of the claims herein. The person skilled in the art will recognize many variations, alternatives, and modifications of embodiments of the present disclosure.

Figure 6:
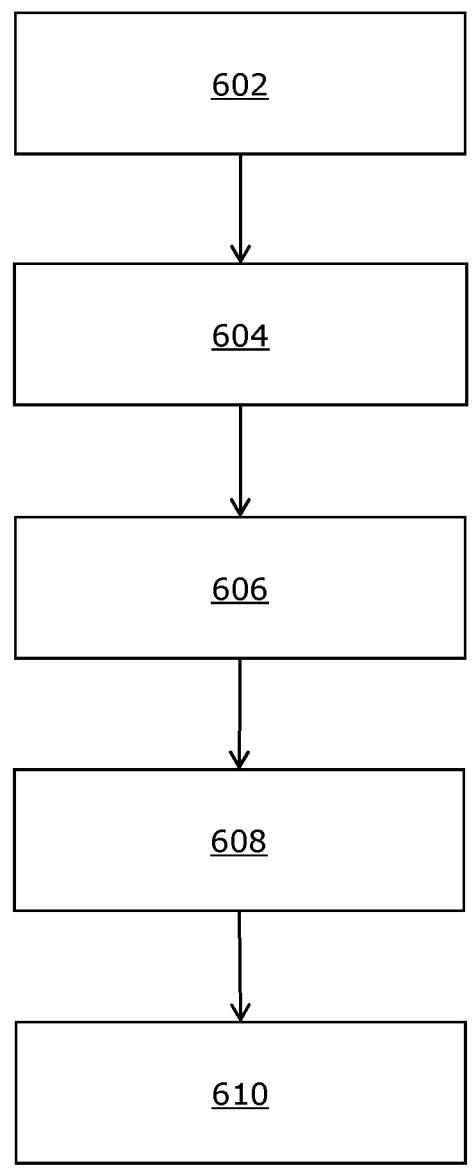
FIG. 6 illustrates a flowchart illustrating steps of a method for tracking, in accordance with an embodiment of the present disclosure.

Referring to FIG. 6, illustrated is a flowchart illustrating steps of a method for tracking, in accordance with an embodiment of the present disclosure. At step 602, a relative pose of at least one user-interaction controller with respect to an HMD is estimated, based on controller-pose-tracking data generated by a controller-pose-tracking means arranged in the at least one user-interaction controller and HMD-pose-tracking data generated by an HMD-pose-tracking means. At step 604, at least one of: a current value, a pulse width modulation (PWM) value to be employed for controlling a brightness of at least one light source from amongst a plurality of light sources is determined, based on the estimated relative pose of the at least one user-interaction controller with respect to the HMD. The plurality of light sources are arranged spatially around the at least one user-interaction controller. At step 606, a control signal is generated for setting the at least one of: the current value, the PWM value for the at least one light source, and the control signal is sent to the at least one user-interaction controller, wherein a light source driver arranged in the at least one user-interaction controller controls the brightness of the at least one light source according to the control signal. At step 608, at least one image captured by at least one camera is processed to identify at least one blob in the at least one image that represents the at least one light source in a real-world environment. The at least one camera is arranged on a portion of the HMD that faces the real-world environment in which the HMD is in use. At step 610, the estimated relative pose of the at least one user-interaction controller with respect to the HMD is corrected based on at least one of: a position, an orientation, a brightness, a size, a shape, of the at least one blob in the at least one image.

The aforementioned steps are only illustrative and other alternatives can also be provided where one or more steps are added, one or more steps are removed, or one or more steps are provided in a different sequence without departing from the scope of the claims herein.

The invention claimed is:

1. A tracking system comprising:
a plurality of light sources arranged spatially around at least one user-interaction controller of a head-mounted device (HMD);
a controller-pose-tracking means arranged in the at least one user-interaction controller;
an HMD-pose-tracking means;
at least one camera arranged on a portion of the HMD that faces a real-world environment in which the HMD is in use; and
at least one processor configured to:
  estimate a relative pose of the at least one user-interaction controller with respect to the HMD, based on controller-pose-tracking data generated by the controller-pose-tracking means and HMD-pose-tracking data generated by the HMD-pose-tracking means;
  determine at least one of: a current value, a pulse width modulation (PWM) value to be employed for controlling a brightness of at least one light source from amongst the plurality of light sources, based on the estimated relative pose of the at least one user-interaction controller with respect to the HMD;
  generate a control signal for setting the at least one of: the current value, the PWM value to be employed for controlling the brightness off the at least one light source, and send the control signal to the at least one user-interaction controller, wherein the at least one of: the current value and the PWM value to be employed for controlling the brightness of the at least one light source is determined using at least one of:
    a look up table including current values corresponding to different distances between the at least one user-interaction controller and the HMD,
    a look up table including PWM values corresponding to different distances between the at least one user-interaction controller and the HMD,
    a function indicative of a manner in which at least one of: the current values and the PWM values vary according to the distance between the at least one user-interaction controller and the HMD; and
  wherein a light source driver arranged in the at least one user-interaction controller controls the brightness of the at least one light source according to the control signal;

wherein the at least one processor is further configured to:
  process at least one image captured by the at least one camera, to identify at least one blob in the at least one image that represents the at least one light source in the real-world environment;
  correct the estimated relative pose of the at least one user-interaction controller with respect to the HMD, based on at least one of: a position, an orientation, a brightness, a size, a shape, of the at least one blob in the at least one image; and
  update the at least one of: the look up table including the current values, the look up table including the PWM values and the function based on the at least one of: the current value, the PWM value to be employed for controlling the brightness of the at least one light source, and the corrected relative pose of the at least one user-interaction controller with respect to the HMD.

2. The tracking system of claim 1, wherein the at least one of: the current value, the PWM value to be employed for controlling the brightness of the at least one light source is determined such that the size of the at least one blob in the at least one image lies in a predefined range.

3. The tracking system of claim 1, wherein the at least one processor is further configured to:
  determine whether the size of the at least one blob is greater than a predefined maximum size; and
  when it is determined that the size of the at least one blob is greater than the predefined maximum size, decrease the at least one of: the current value, the PWM value for controlling the brightness of the at least one light source.

4. The tracking system of claim 1, wherein the at least one processor is further configured to:
  determine whether the size of the at least one blob is smaller than a predefined minimum size; and
  when it is determined that the size of the at least one blob is smaller than the predefined minimum size, increase the at least one of: the current value, the PWM value for controlling the brightness of the at least one light source.

5. The tracking system of claim 1, wherein the at least one processor is further configured to:
  generate a reset control signal for setting at least one of: a maximum current value, a maximum PWM value for each of the plurality of light sources, and send the reset control signal to the at least one user-interaction controller, wherein the light source driver arranged in the at least one user-interaction controller controls the brightness of each of the plurality of light sources according to the reset control signal;
  process at least one reset image captured by the at least one camera, to identify one or more blobs in the at least one reset image that represent one or more light sources from amongst the plurality of light sources in the real-world environment; and
  estimate a relative pose of the at least one user-interaction controller with respect to the HMD, based on at least one of: a position, an orientation, a brightness, a size, a shape of each of the one or more blobs in the at least one reset image.

6. The tracking system of claim 1, wherein the at least one of: the current value, the PWM value to be employed for controlling the brightness of the at least one light source is determined such that the size of the at least one blob in the at least one image lies in a predefined range.

7. A method for tracking, the method comprising:
  estimating a relative pose of at least one user-interaction controller with respect to a head-mounted device (HMD), based on controller-pose-tracking data generated by a controller-pose-tracking means arranged in the at least one user-interaction controller and HMD-pose-tracking data generated by an HMD-pose-tracking means;
  determining at least one of: a current value, a pulse width modulation (PWM) value to be employed for controlling a brightness of at least one light source from amongst a plurality of light sources arranged spatially around the at least one user-interaction controller, based on the estimated relative pose of the at least one user-interaction controller with respect to the HMD;
  generating a control signal for setting the at least one of: the current value, the PWM value to be employed for controlling the brightness of the at least one light source, and sending the control signal to the at least one user-interaction controller, wherein a light source driver arranged in the at least one user-interaction controller controls the brightness of the at least one light source according to the control signal;
  processing at least one image, captured by at least one camera arranged on a portion of the HMD that faces a real-world environment in which the HMD is in use, to identify at least one blob in the at least one image that represents the at least one light source in the real-world environment;
  correcting the estimated relative pose of the at least one user-interaction controller with respect to the HMD, based on at least one of: a position, an orientation, a brightness, a size, a shape, of the at least one blob in the at least one image,
  wherein the at least one of: the current value, the PWM value to be employed for controlling the brightness of the at least one light source is determined using at least one of:
    a look up table including current values corresponding to different distances between the at least one user-interaction controller and the HMD,
    a look up table including PWM values corresponding to different distances between the at least one user-interaction controller and the HMD,
    a function indicative of a manner in which at least one of: current values, PWM values vary according to a distance between the at least one user-interaction controller and the HMD; and
  updating the at least one of: the look up table including the current values, the look up table including the PWM values, the function, based on the at least one of: the current value, the PWM value employed for controlling the brightness the at least one light source, and the corrected relative pose of the at least one user-interaction controller with respect to the HMD.

8. The method of claim 7, wherein the at least one of: the current value, the PWM value to be employed for controlling the brightness of the at least one light source is determined such that the size of the at least one blob in the at least one image lies in a predefined range.

9. The method of claim 7, further comprising:
  determining whether the size of the at least one blob is greater than a predefined maximum size; and
  when it is determined that the size of the at least one blob is greater than the predefined maximum size, decreasing the at least one of: the current value, the PWM value to be employed for controlling the brightness off the at least one light source.

10. The method of claim 7, further comprising:
determining whether the size of the at least one blob is smaller than a predefined minimum size; and
when it is determined that the size of the at least one blob is smaller than the predefined minimum size, increasing the at least one of: the current value, the PWM value to be employed for controlling the brightness of the at least one light source.

11. The method of claim 7, further comprising:
generating a reset control signal for setting at least one of: a maximum current value, a maximum PWM value for each of the plurality of light sources, and sending the reset control signal to the at least one user-interaction controller, wherein the light source driver arranged in the at least one user-interaction controller controls the brightness of each of the plurality of light sources according to the reset control signal;
processing at least one reset image captured by the at least one camera, for identifying one or more blobs in the at least one reset image that represent one or more light sources from amongst the plurality of light sources in the real-world environment; and
estimating a relative pose of the at least one user-interaction controller with respect to the HMD, based on at least one of: a position, an orientation, a brightness, a size, a shape of each of the one or more blobs in the at least one reset image.

12. A tracking system comprising:
a plurality of light sources arranged spatially around at least one user-interaction controller of a head-mounted device (HMD);
a controller-pose-tracking means arranged in the at least one user-interaction controller;
an HMD-pose-tracking means;
at least one camera arranged on a portion of the HMD that faces a real-world environment in which the HMD is in use; and
at least one processor configured to:
estimate a relative pose of the at least one user-interaction controller with respect to the HMD, based on controller-pose-tracking data generated by the controller-pose-tracking means and HMD-pose-tracking data generated by the HMD-pose-tracking means;
determine at least one of: a current value, a pulse width modulation (PWM) value to be employed for controlling a brightness of at least one light source from amongst the plurality of light sources, based on the estimated relative pose of the at least one user-interaction controller with respect to the HMD;
generate a control signal for setting the at least one of: the current value, the PWM value for the at least one light source, and send the control signal to the at least one user-interaction controller, wherein a light source driver arranged in the at least one user-interaction controller controls the brightness of the at least one light source according to the control signal;
process at least one image captured by the at least one camera, to identify at least one blob in the at least one image that represents the at least one light source in the real-world environment; and
correct the estimated relative pose of the at least one user-interaction controller with respect to the HMD, based on at least one of: a position, an orientation, a brightness, a size, a shape, of the at least one blob in the at least one image, wherein the at least one processor is further configured to:
generate a reset control signal for setting at least one of: a maximum current value, a maximum PWM value for each of the plurality of light sources, and send the reset control signal to the at least one user-interaction controller, wherein the light source driver arranged in the at least one user-interaction controller controls the brightness of each of the plurality of light sources according to the reset control signal;
process at least one reset image captured by the at least one camera, to identify one or more blobs in the at least one reset image that represent one or more light sources from amongst the plurality of light sources in the real-world environment; and
estimate a relative pose of the at least one user-interaction controller with respect to the HMD, based on at least one of: a position, an orientation, a brightness, a size, a shape of each of the one or more blobs in the at least one reset image.

13. The tracking system of claim 12, wherein the at least one processor is further configured to:
determine whether the size of the at least one blob is greater than a predefined maximum size; and
when it is determined that the size of the at least one blob is greater than the predefined maximum size, decrease the at least one of: the current value, the PWM value for controlling the brightness of the at least one light source.

14. The tracking system of claim 12, wherein the at least one processor is further configured to:
determine whether the size of the at least one blob is smaller than a predefined minimum size; and
when it is determined that the size of the at least one blob is smaller than the predefined minimum size, increase the at least one of: the current value, the PWM value for controlling the brightness of the at least one light source.

15. The tracking system of claim 12, wherein the at least one of: the current value, the PWM value to be employed for controlling the brightness of the at least one light source is determined using at least one of:
a look up table including current values corresponding to different distances between the at least one user-interaction controller and the HMD,
a look up table including PWM values corresponding to different distances between the at least one user-interaction controller and the HMD,
a function indicative of a manner in which at least one of: current values, PWM values vary according to a distance between the at least one user-interaction controller and the HMD.

16. The tracking system of claim 15, wherein the at least one processor is further configured to update the at least one of: the look up table including the current values, the look up table including the PWM values, the function, based on the at least one of: the current value, the PWM value employed for the at least one light source, and the corrected relative pose of the at least one user-interaction controller with respect to the HMD.

* * * * *